UNITED STATES PATENT OFFICE.

ABRAHAM T. HAY, OF BURLINGTON, IOWA.

IMPROVEMENT IN THE MANUFACTURE OF IRON, STEEL, &c.

Specification forming part of Letters Patent No. 133,098, dated November 19, 1872.

*To all whom it may concern:*

Be it known that I, ABRAHAM T. HAY, of Burlington, in the county of Des Moines and State of Iowa, have invented certain new and useful Improvements in Manufacture of Iron, Steel, &c.; and I do hereby declare that the following is a full, clear, and exact description thereof that will enable others skilled in the art to which it appertains to make and use the same, reference being had to the accompanying drawing, and to the letters of reference marked thereon, which forms a part of this specification.

My invention relates to the means of facilitating the purification of iron, and the manufacture of steel, and the carbonizing of any particular part of a bar or mass of iron, so as to combine iron on the one side and steel on the other; or, in the same piece of metal, to convert one end into steel, the other end being iron.

I have found, first, that if I place in a crucible or closed retort one part by weight of the heavy bright carburet of iron, three parts by weight of the dark high carburet, or, in other proportions, (both of which products are new, and are obtained by the process set forth in my application for Letters Patent for "reduction of ores, purification of metals, &c.," filed herewith,) in connection with a small percentage of the oxide of iron and free lime, I produce, by heat, a molten bath or solution below the temperature that wrought-iron fuses, that will convert any piece of iron immersed therein, when at a bright red or white heat, into steel, while any portion of said metal not immersed will remain iron; second, in an open hearth, under a coal fire, these carburet products, when exposed to the blast, intensify the heat and at the same time give to iron heated therein steel properties; third, a molten solution of dark carburet alone imparts to iron immersed therein a coating of new and, apparently, chemically-pure white iron permeating its pores, that renders it less liable to oxidize when exposed to the air.

I do not limit myself to the proportions set forth; but other proportions may be found, upon experiment, to produce even better results; nor do I limit myself to the use of the particular carburets set forth, as other carburets may be produced that will effect similar results.

Fourth, also, when common steel and the dark carburet are brought together, in connection with iron, at a temperature, in a blacksmith's fire that fuses steel, the iron will take on steel properties.

What I claim, broadly, and desire to secure by Letters Patent, is—

1. The within-described method of converting iron, either in whole or in part, into steel, substantially as set forth.

2. The within-described method of producing upon iron a coating of new iron that improves its ductility and malleability, and renders it not liable to oxidize upon exposure to the air, and which coating permeates the structure of that portion to which it is applied.

3. As a non-corrosive metallic coating for steel and other ferruginous products, the within-described metallic bath.

In testimony that I claim the foregoing I have hereunto set my hand.

ABRAHAM T. HAY.

Witnesses:
WELLS W. LEGGETT,
EDM. F. BROWN.